(12) United States Patent
Mitchell et al.

(10) Patent No.: US 9,157,494 B2
(45) Date of Patent: Oct. 13, 2015

(54) CENTRIFUGAL ENGAGEMENT AND DISENGAGEMENT DRIVE SYSTEMS

(71) Applicant: HONEYWELL INTERNATIONAL, INC., Morristown, NJ (US)

(72) Inventors: Robert K. Mitchell, Phoenix, AZ (US); Allan D. Steves, Scottsdale, AZ (US); James Knorr, Tempe, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 93 days.

(21) Appl. No.: 13/960,961

(22) Filed: Aug. 7, 2013

(65) Prior Publication Data
US 2015/0041279 A1    Feb. 12, 2015

(51) Int. Cl.
*F16D 43/06* (2006.01)
*F16D 43/30* (2006.01)
*F16D 129/04* (2012.01)

(52) U.S. Cl.
CPC ............ *F16D 43/06* (2013.01); *F16D 43/30* (2013.01); *F16D 2129/043* (2013.01)

(58) Field of Classification Search
CPC ......... F16D 43/06; F16D 43/10; F16D 43/24; F16D 43/30; F16D 2129/043; F16D 23/06; F16D 23/0612
USPC ..................... 192/89.1, 104 R, 105 B, 103 A
See application file for complete search history.

(56) References Cited

U.S. PATENT DOCUMENTS

| | | | | |
|---|---|---|---|---|
| 2,937,730 A | * | 5/1960 | Quenneville | 192/103 A |
| 3,306,406 A | * | 2/1967 | Poliseo | 192/46 |
| 4,114,746 A | * | 9/1978 | Usui et al. | 192/104 R |
| 5,419,420 A | | 5/1995 | Quenneville | |
| 7,137,498 B2 | | 11/2006 | Gochenour et al. | |
| 2008/0078643 A1 | | 4/2008 | Yetzke | |
| 2009/0211868 A1 | | 8/2009 | Inomori et al. | |

FOREIGN PATENT DOCUMENTS

GB        1080612 A    8/1967

* cited by examiner

*Primary Examiner* — Rodney H Bonck
(74) *Attorney, Agent, or Firm* — Shimokaji IP

(57) ABSTRACT

A drive system may provide centrifugally driven clutch members into engagement and disengagement using weights between an interface of the clutch members. The weights maybe disposed in races between the clutch members. The weights may move centrifugally within the races pushing the clutch members apart during rotation of an input drive shaft. In some embodiments, two clutch members may provide the engagement and disengagement of the input drive shaft power to a drive output member and a third clutch member may be configured to engage the two clutch members during drive engagement. The third clutch member may be configured to disengage from the two clutch members as a failsafe during, for example, an overspeed condition or a jammed clutch interface.

18 Claims, 5 Drawing Sheets

CENTRIFUGAL ENGAGEMENT AND DISENGAGEMENT DRIVE SYSTEMS

BACKGROUND OF THE INVENTION

The present invention generally relates to drive systems and more particularly, centrifugal engagement and disengagement drive systems.

In some aircraft, the wheels may be electrically driven by the motor during taxiing (sometimes referred to as E-taxi systems). Engagement and disengagement of the wheels to move the aircraft may require a clutch device to transfer drive power from the motor to the wheels. In some systems, the clutch device may be engaged by a direct command from the pilot. It is known to use, for example, push/pull type clutches to engage the input shaft with the output shaft. However, in some cases, the rotation of the input drive shaft may overwhelm the output drive shaft potentially damaging the elements (for example, the wheel assembly) connected to the output shaft. In other instances, the clutch device may become jammed staying connected to the output shaft after a command to disengage has been sent.

As can be seen, there is a need to for a drive system that can power a drive output device while providing a failsafe to oversped or jammed clutch devices.

SUMMARY OF THE INVENTION

In one aspect of the present invention, a drive system comprises a first clutch member coaxially adapted for connection to a shaft, the first clutch member including a first engagement face; a second clutch member adapted for connection to a drive output member, the second clutch member including a second engagement face indexed for coupling to the first engagement face; and a race disposed between the first and second engagement faces, the race extending radially toward circumferential edges of the first and second clutch members, the race configured to receive a weight that travels radially along the race between the first and second engagement faces during a rotation of the shaft, and the first and second clutch members are adapted to engage with and separate from one another as the weight travels radially along the race during rotation of the shaft.

In another aspect of the present invention, a drive system comprises a first clutch member coupled to a shaft; a second clutch member coupled to the first clutch member, the second clutch member configured to: couple to the first clutch member in response to the rotational speed of the shaft equaling or falling below a first threshold rotational speed, and de-couple from the first clutch member in response to the rotational speed of the shaft exceeding the first threshold rotational speed; and a third clutch member configured to: couple to the second clutch member in response to the rotational speed of the shaft exceeding the first rotational speed, and de-couple from the second clutch member in response to the rotational speed of the shaft exceeding a second threshold rotational speed.

In yet another aspect of the present invention, a drive system comprises a first clutch plate coupled to a shaft; a second clutch plate including a first surface indexed to couple with a surface of the first clutch plate, the first clutch plate surface and the second clutch plate first surface including race wall surfaces configured to form a first race between the first and second clutch plates, the first race extending radially outward from the shaft toward circumferential edges of the first and second clutch plates; a first weight disposed in the first race; a third clutch plate coupled to a drive output member, the second clutch plate including a second clutch plate surface configured to: couple with a first surface of the third clutch plate in response to a radially outward movement of the first weight in the first race, and de-couple from the first surface of the third clutch plate in response to a radially inward movement of the weight in the first race.

These and other features, aspects and advantages of the present invention will become better understood with reference to the following drawings, description and claims.

BRIEF DESCRIPTION OF THE DRAWINGS

FIG. 4A shows a disengaged engagement drive and an engaged disengagement drive; FIG. 4B shows an engaged engagement drive and an engaged disengagement drive; FIG. 4C shows an engaged engagement drive and a disengaged disengagement drive; and FIG. 4D shows a disengaged engagement drive and a disengaged disengagement drive.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a clutch system that may be beneficial to, for example, taxi systems in aircraft. The embodiments disclosed may be useful in engagement and disengagement of electric motors to aircraft wheels. In some exemplary embodiments, weights may be provided that move centrifugally with rotational motion of one or more clutch elements to move clutch elements away from or toward one another. In some embodiments, some of the clutch elements may be configured for engagement. In some embodiments, the clutch elements may be configured for disengagement. In addition, some embodiments may include clutch engagement and disengagement systems that may occur at different rotational speeds of a shaft connected to the motor. For example, an overspeed clutch may be connected to an engagement clutch to provide disconnection of an output gear from the clutch system when the wheel driven by gear 120 exceeds a threshold rotational speed of the shaft driven by the motor. Thus, the clutch system may provide a failsafe for devices connected to the output gear from overspeed of the shaft or from a jammed clutch interface.

Figure 1A:
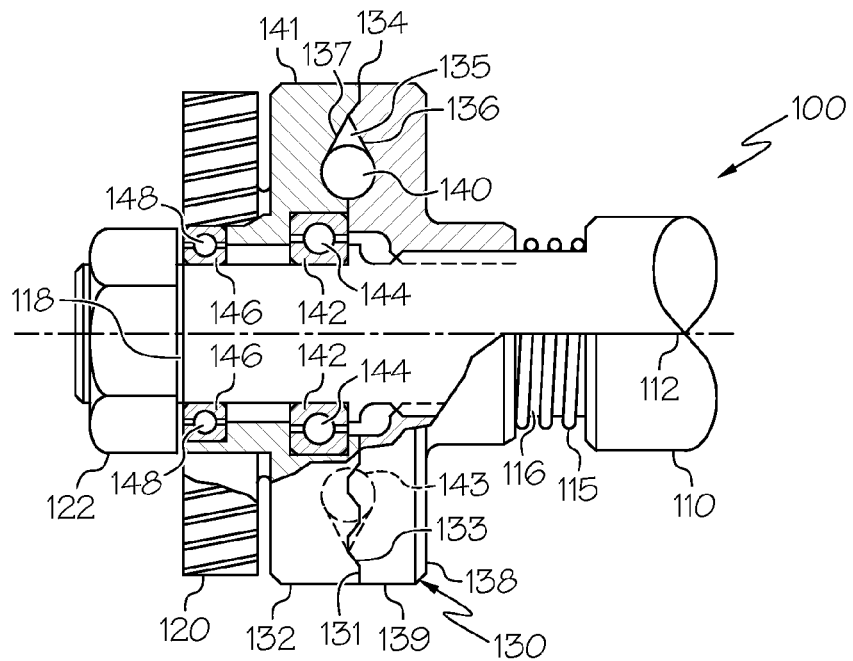
FIGS. 1A and 1B are side cross-sectional views of a drive system in an engaged and a disengaged drive state according to an exemplary embodiment of the present invention.
Figure 1B:
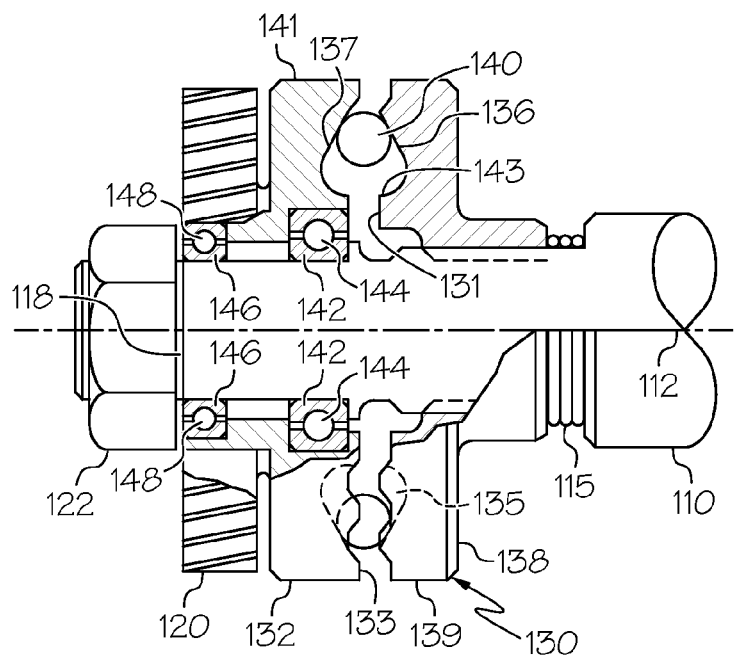

Referring to FIGS. 1A and 1B, a drive system 100 is shown according to an exemplary embodiment of the present invention. FIG. 1A shows the drive system 100 in an engaged drive state. FIG. 1B shows the system 100 in a disengaged drive state. The drive system 100 may be coaxially mounted to a drive input shaft 110 (sometimes referred to as the shaft 110) that may couple, for example, an electric motor (not shown) to a drive output member 120 via an input end 112. The drive output member 120 may be, for example, a drive gear that may be connected, for example, to a wheel system (not shown). The drive output member 120 maybe attached by a fastener 122 to an output end 118 of the shaft 110. While the fastener 122 shown is a nut, it will be understood that other fastening means may be used depending on the drive output member 120 used. Additionally, while the following embodiments are described in the context of a motor and wheel connection, it will be understood that other applications using a clutch system may benefit from exemplary embodiments of the present invention.

The drive system 100 may include a clutch system 130. The clutch system 130 may be mounted coaxially onto the shaft 110. The clutch system 130 may include two halves; a clutch member 132 and a clutch member 138 coupled to one another at engagement faces 133 and 131 of respective clutch members 132, 138. The clutch member 138 may interface the shaft 110 on spline 116 (hidden by spring 115) allowing the clutch member 132 to travel forward and aft along shaft 110. The clutch member 132 may interface with shaft 110 through bearings 144 & 146. The clutch member 138 may be separable from the clutch member 132. For example, the clutch member 132 may couple to the clutch member 138 in response to the rotational speed of the shaft 110 meeting or falling below a first threshold rotational speed. The clutch member 132 may de-couple from the clutch member 138 above the first threshold rotational speed of the shaft 110.

In some embodiments, the clutch members 132 and 138 maybe plates, disks, blocks or other clutch type devices. The engagement faces 131 and 133 may couple to each other to provide a clutch interface 134 transferring power from the shaft 110 to the drive output member 120. In some embodiments, the engagement faces 131 and 133 may be flat, splined, or curvic for example. In an exemplary embodiment, the engagement faces 131 and 133 may include wall surfaces 136 and 137. The surface 137 may be a 360° circumferential race while surface 136 may be multiple localized slots that extend out radially. In some embodiments, the wall surfaces 136 and 137 may taper narrowingly towards each other as they approach the circumferential edges 139 and 141 forming what appears as teardrop shaped races 135. The races 135 may extend from adjacent the shaft 110 radially outward toward circumferential edges 139 and 141 of the clutch members 132 and 138. The races 135 may receive weights 140 between the engagement faces 131 and 133. In an exemplary embodiment, the weights 140 may be spherical ball bearings. The ball bearings (weights 140) may roll through the races 135 in constant engagement with the wall surfaces 136 and 137 while widening the races 135 as the weights 140 move toward the circumferential edges 139 and 141.

In the engaged drive state (FIG. 1A), the weights 140 may be positioned in a well 143 of the races 135. As the shaft 110 rotates, the weights 140 may move toward the circumferential edges 139 and 141. In some embodiments, the weights 140 may not move until the shaft 110 meets a threshold rotational speed. As the rotational speed of the shaft 110 increases, the weights 140 move centrifugally pushing against the wall surfaces 136 and 137 separate the engagement faces 131 and 133 from each other until the clutch members 132 and 138 decouple and the clutch system 130 enters a disengaged state (FIG. 1B). In some embodiments, the spring 115 may become compressed providing a return force so that when the rotational speed of the shaft 110 drops and the weights 140 move radially inward along the races 135 toward the shaft 110, the spring 115 may urge the clutch member 138 back toward the clutch member 132 into the engaged state.

Figure 2A:
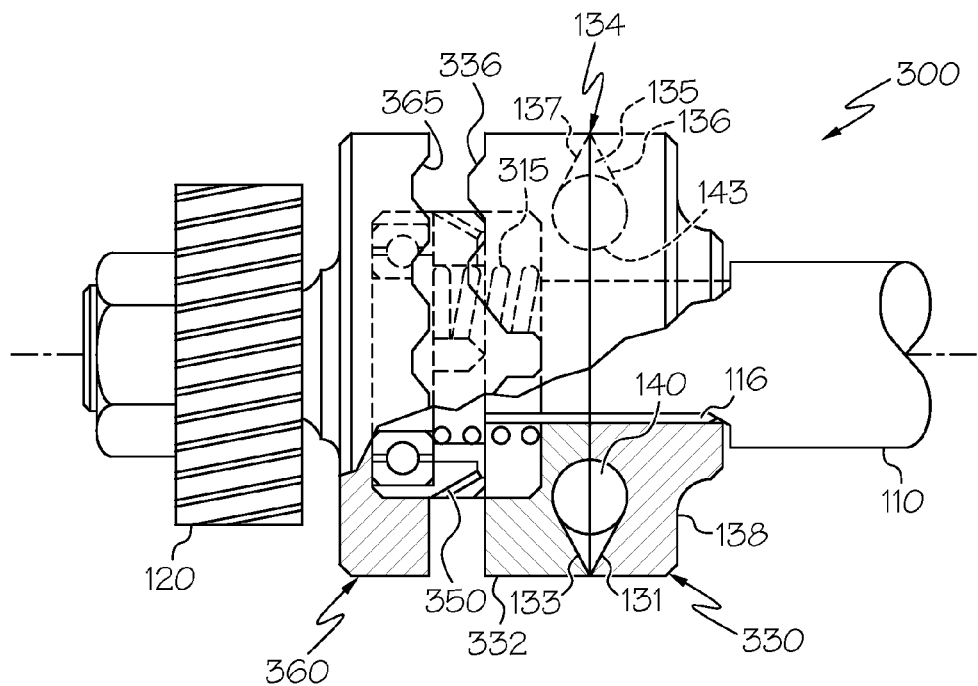
FIGS. 2A and 2B are side cross-sectional views of a drive system in a disengaged and an engaged drive state respectively according to another exemplary embodiment of the present invention.
Figure 2B:
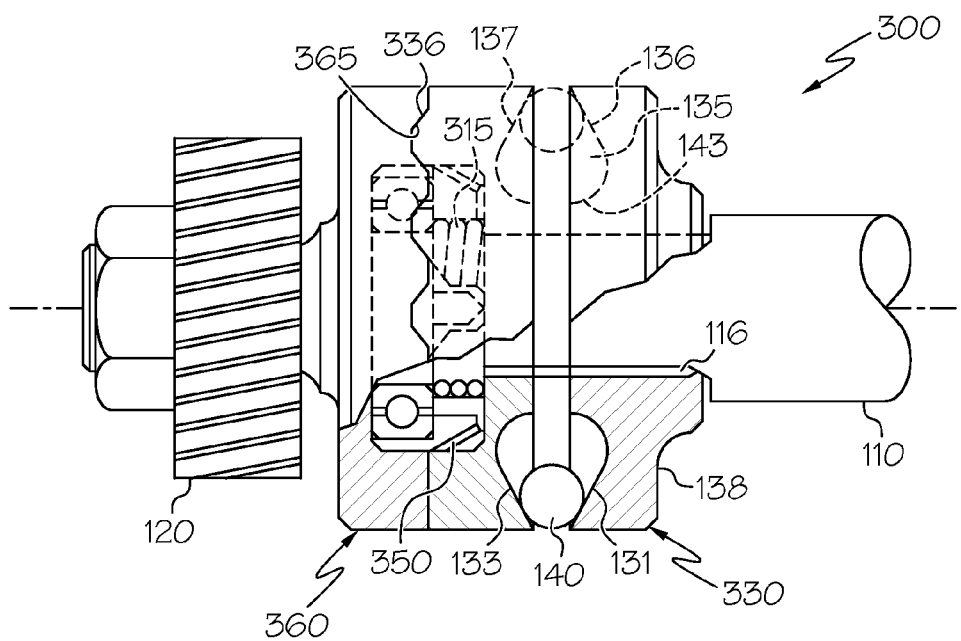

Referring now to FIGS. 2A and 2B, a drive system 300 is shown according to another exemplary embodiment of the present invention. The drive system 300 may be mounted to the shaft 110, drive output member 120 and fastener 122 similar to how the drive system 100 is coupled to these parts. FIG. 2A shows the drive system 300 in a disengaged drive state. FIG. 2B shows the drive system 300 in an engaged drive state. The drive system 300 may include a clutch system 330 and a clutch system 360 that when coupled together, may engage the shaft 110 to the drive output member 120.

The clutch system 330 may be similar to the clutch system 130 except that instead of a clutch member 132, a clutch member 332 may be used. The clutch member 332 may be similar to the clutch member 132 except that it may include an engagement surface 336 on an opposite side from the engagement surface 133. The clutch system 330 may operate in the same manner as the clutch system 130 using the weights 140 in the races 135 to separate clutch member 332 from clutch member 138 (which may cause clutch member 332 to slide along spline 116) and engage the clutch member 332 from and to the clutch member 360 during rotation of the shaft 110.

The clutch system 360 may include an engagement surface 365 facing the engagement surface 336. The engagement surface 365 may be indexed for coupling to the engagement face 336 when the clutch member 332 de-couples from the clutch member 138. When the clutch member 332 couples to the clutch system 360, power from the shaft 110 may be transferred to the drive output member 120.

In some embodiments, the drive system 300 may use a baulk ring synchronizer 350 that uses a cone ring and may be mounted coaxially onto the shaft 110 between the clutch system 330 and the clutch system 360. The synchronizer 350 may align for example, the teeth, splines, curvic, etc. of the engagement surface 336 to those corresponding teeth, splines, curvic, etc. of the engagement surface 365 prior to engagement of the clutch system 330 to the clutch system 360.

In some embodiments, the drive system 300 may include a spring 315. The spring 315 may be mounted coaxially onto the shaft 110 between the clutch member 332 and the clutch system 360 engaging internal surfaces (blocked from view) of each clutch system 330 and 360. The cone synchronizer 350 may be mounted concentrically around the spring 315. The spring 315 may bias the clutch member 332 away from the clutch system 360. As the weights 140 move the clutch member 332 into engagement with the clutch system 360, the spring 315 may compress until the rotational speed of the shaft 110 reduces at which point the spring 315 may push the clutch member 332 back toward the clutch member 138. Similar to the drive system 100, as the rotational speed of the shaft 110 lowers the weights 140 may move inwardly along the races 135 toward the shaft 110, thus allowing the engagement surfaces 131 and 133 to move towards each other. While the foregoing embodiment is described using a cone type synchronizer, it will be understood that other synchronizer types may be used including, for example a baulk ring type synchronizer.

Figure 3A:
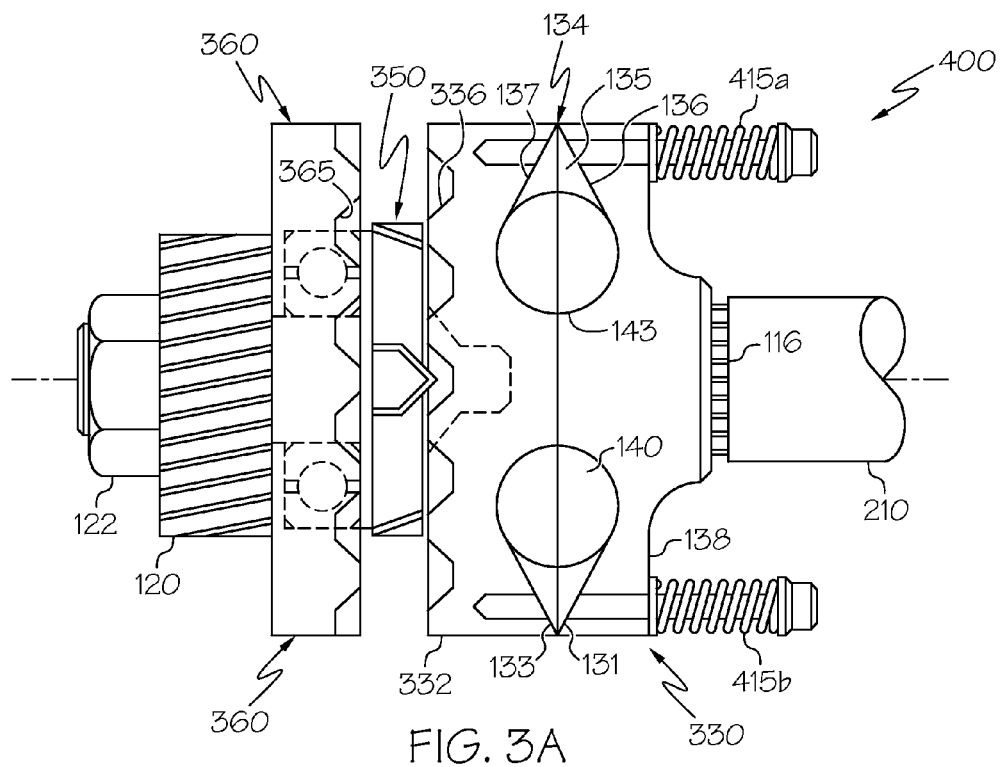
FIGS. 3A and 3B are side cross-sectional views of a drive system in a disengaged and an engaged drive state respectively according to another exemplary embodiment of the present invention.
Figure 3B:
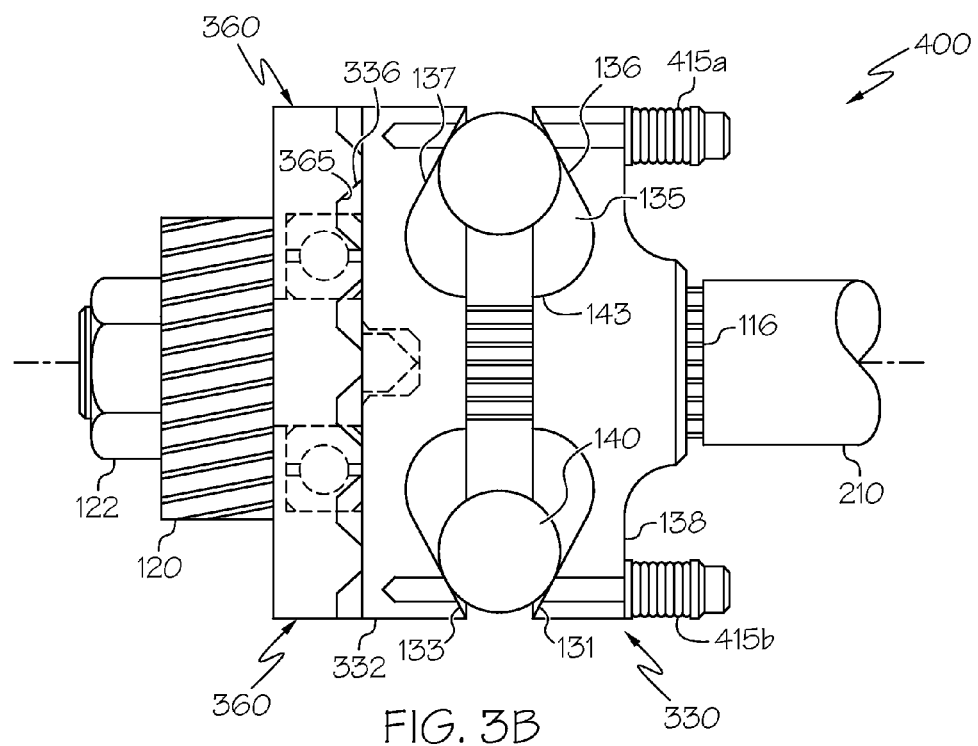

Referring now to FIGS. 3A and 3B, a drive system 400 is shown according to an exemplary embodiment of the present invention. The drive system 400 is shown in a disengaged drive state in FIG. 3A and in an engaged drive state in FIG. 3B. The drive system 400 is similar to the drive system 300 except as shown, uses baulk ring type synchronizer and in some embodiments may include external springs depicted by 415a and 415b (referred to in general as springs 415) connected to the clutch system 330 to provide a return force to the clutch member 138 when it is disengaged from the clutch member 332. In response to the weights 140 move radially outward, the clutch member 332 and the clutch member 138 may move away from each other along the splines 116 compressing the external springs 415. In response to the weights 140 move radially inward toward the shaft 210, the springs 415 may help push the clutch member 138 back toward engagement with the clutch member 332. While the foregoing embodiment is shown using a baulk ring synchronizer it will be understood that aspects of the drive system 400 may also use a cone type synchronizer as described in FIGS. 2A and 2B.

Figure 4A:
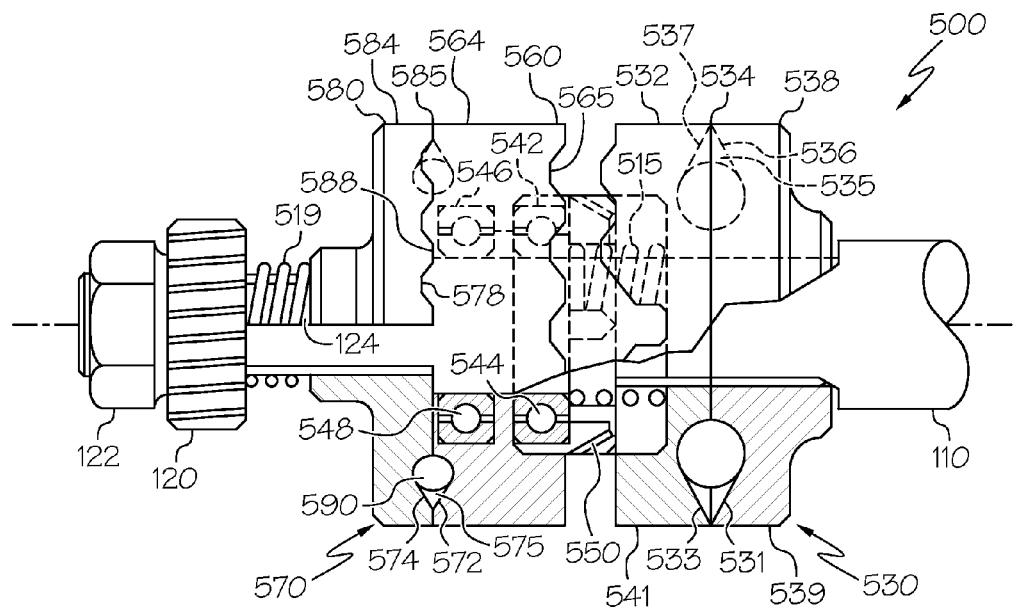
FIGS. 4A-4D are side cross-sectional views of a drive system according to another exemplary embodiment of the present invention where
Figure 4B:
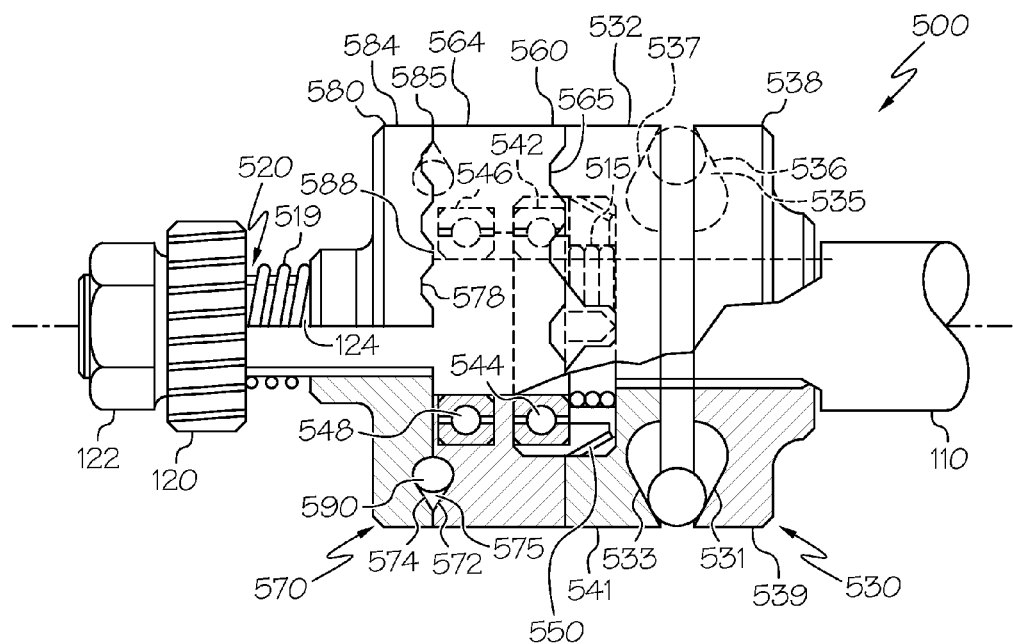
Figure 4C:
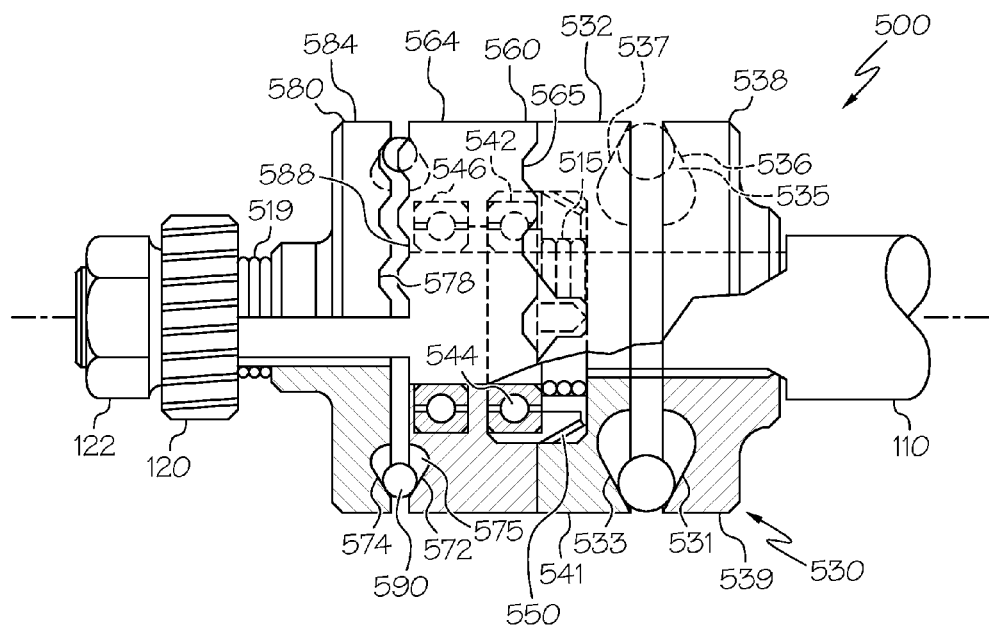
Figure 4D:
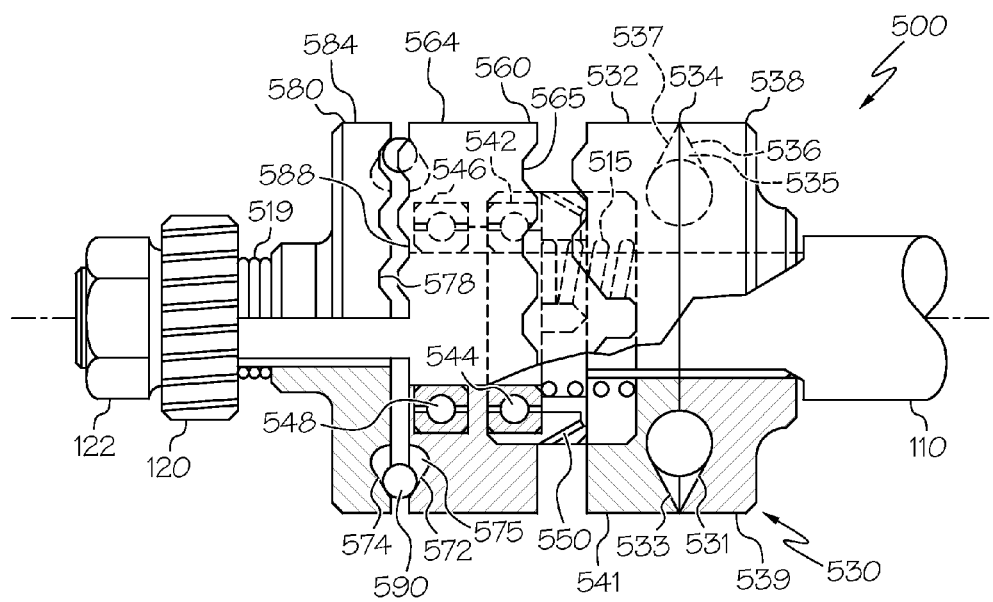

Referring now to FIGS. 4A-4D, a drive system 500 is shown according to an exemplary embodiment of the present invention. The drive system 500 may include an engagement drive system 530 and a disengagement dive system 570. The engagement drive system 530 may be configured to transfer drive power from the shaft 110 to the drive output member 120. The disengagement drive system 570 may be configured to release the drive output member 120 from receiving drive power from the shaft 110, for example, to protect the drive output member 120 from an overspeed condition or when the disengagement drive system 570 is unable to de-couple from the engagement drive system 530. FIG. 4A shows a disengaged engagement drive system 530 and an engaged disengagement drive system 570. FIG. 4B shows an engaged engagement drive system 530 and an engaged disengagement drive system 570. FIG. 4C shows an engaged engagement drive system 530 and a disengaged disengagement drive system 570. FIG. 4D shows a disengaged engagement drive system 530 and a disengaged disengagement drive system 570.

The engagement drive system 530 may be mounted coaxially onto the shaft 110. In some embodiments, the disengagement drive system 570 may be mounted coaxially onto a shaft 124 that is collinear with the shaft 110. In some embodiments, an internally disposed spring 515 may be coaxially mounted to the shaft 110 between the engagement drive system 530 (coupled for example to clutch member 532) and the disengagement drive system 570 (coupled for example to clutch member 560). In some embodiments, the drive system 500 may include a cone synchronizer 550 mounted coaxially onto the shaft 110 between the engagement drive system 530 (coupled for example to clutch member 532) and the disengagement drive system 570 (coupled for example to clutch member 560). The disengagement drive system 570 may be connected to the drive output member 120 to transfer drive power from the shaft 110 to the shaft 124 and to the drive output member 120. In some embodiments, a spring 519 may be mounted coaxially onto the shaft 124 to bias the disengagement drive system 570 toward the engagement drive system 530. As shown previously, some embodiments may include a fastener 122 to secure the drive output member 120 into place.

The engagement drive 530 may include two halves; a clutch member 532 and a clutch member 538 interfaced to 110 on spline 116 and interfaced with each other at engagement faces 533 and 531 to provide clutch interface 534. The clutch member 538 may be separable from the clutch member 532 so that the clutch member 532 may couple to the clutch member 538 in response to the shaft 110 meeting or falling below a first threshold rotational speed. When the clutch members 532 and 538 are together, the engagement drive system 530 may be considered in the disengaged state as shown in FIGS. 4A and 4D. In the disengaged state, the drive system 530 may not be providing power to the shaft 124 from the shaft 110. The clutch member 532 may be separated from the clutch member 538 in response to the shaft 110 exceeding the first threshold rotational speed. When the clutch members 532 and 538 are separated from one another, clutch member 532 may couple with clutch member 560, and the engagement drive system 530 may be considered in the engaged state as shown in FIGS. 4B and 4C. In the engaged state, the drive system 530 may provide power to the shaft 124 from the shaft 110 depending on the state of the disengagement drive system 570.

The clutch members 532 and 538 maybe plates, disks, blocks or other clutch type device. In an exemplary embodiment, the engagement faces 531 and 533 may include wall surfaces 536 and 537 that form races 535. The races 535 may extend from adjacent the shaft 110 radially outward toward circumferential edges 541 and 539 of the clutch members 532 and 538. The races 535 may receive weights 140 between the engagement faces 531 and 533. In an exemplary embodiment, the weights 140 may be spherical ball bearings. In some embodiments, the wall surfaces 536 and 537 may taper narrowingly towards each other as they approach the circumferential edges 539 and 541. The spring 515 may be mounted in an uncompressed state to bias the clutch member 532 toward the clutch member 538. During rotation of the shaft 110, the ball bearings (weights 140) may roll through the race 535 in constant engagement with the wall surfaces 536 and 537. Upon sufficient speed to overcome the force of the spring 515, the weights 140 may widen the race 535 as the weights 140 move toward the circumferential edges 539 and 541 separating the clutch member 532 from the clutch member 538. In the separated position, the clutch member 532 may remain connected to the shaft 110 through spline 116 thus maintaining the ability to transfer power therefrom. In the separated position, the clutch member 532 may move toward engagement with an engagement face 565 of the disengagement drive system 570.

The disengagement drive system 570 may include two halves; a clutch member 560 and a clutch member 580 coupled to one another at engagement faces 578 and 588. The clutch member 560 may include the engagement faces 565 and 578 while the engagement face 588 may be associated with the clutch member 580. The clutch members 560 and 580 maybe plates, disks, blocks or other clutch type device. The engagement faces 578 and 588 may couple to each other to provide a clutch interface 585. In some embodiments, the engagement faces 578 and 588 may be flat, splined, or curvic for example. In an exemplary embodiment, the engagement faces 578 and 588 may include wall surfaces 572 and 574 that form races 575. The wall surface 572 may be a 360° circumferential race while surface 574 may be multiple localized slots that extend out radially. In some embodiments, the wall surfaces 572 and 574 may taper narrowingly towards each other as they approach the circumferential edges 564 and 584 forming what appears as teardrop shaped races 575. The races 575 may extend from adjacent the shaft 110 radially outward toward circumferential edges 564 and 584 of the clutch members 560 and 580. The races 575 may receive weights 590 between the engagement faces 578 and 588. In an exemplary embodiment, the weights 590 may be spherical ball bearings.

In some embodiments, the weights 590 may have more mass than the weights 140. In some embodiments, the quantity of weights 590 in the disengagement drive system 570 may be unequal to the quantity of weights 140 in the engagement drive system 530. The clutch member 580 may interfaces with the shaft 124 on spline 520 (hidden by spring 519). The clutch member 560 may interface with shaft 124 through bearing 546 and 542. The wall surfaces 572 and 574 may taper narrowingly towards each other as they approach the circumferential edges 564 and 584. During rotation of the shaft 124 the ball bearings (weights 590) may move along the race 575 in constant engagement with the wall surfaces 572 and 574. Upon sufficient speed to overcome the force of the spring 519, the weights 590 may widen the race 575 as the weights 590 move toward the circumferential edges 564 and 584 de-coupling the clutch member 580 from the clutch member 560. In the de-coupled position, the clutch member 580 may be freed from connection to the shaft 110 thus removing the drive output member 120 from the ability to receive power during an overspeed condition. The condition shown in FIG. 4D may exist when, for example, an aircraft is traveling by some other means (for example, using main engines) and the motor drive of the ETAXI system is not powered. This prevents the ETAXI system from being driven to high speed in conditions such as take-off or landings.

The clutch member 560 may be separable from the clutch member 580 so that the clutch member 560 may be coupled to the clutch member 580 in a default operating position above the first threshold rotational speed of the shaft 110. When the clutch members 560 and 580 are coupled together, the disengagement drive system 580 may be considered in the engaged state with the drive output member 120 transferring power from the engagement drive system 530 to the drive output member 120 as shown in FIG. 4B.

When the clutch members 560 and 580 are de-coupled from one another, the disengagement drive system 570 may be considered in the disengaged state. In the disengaged state, the drive system 580 may not be providing power to the shaft 124 from the shaft 110. The clutch member 580 may de-couple from the clutch member 560 above a second threshold rotational speed of the shaft 110 as shown in FIG. 4C. Thus, for example, in response to the shaft 110 exceeding a rotational speed that may damage the recipient of the drive power, the clutch member 580 may disengage the drive output member 120 from the clutch member 560 protecting the recipients of the drive power from being oversped.

It should be understood, of course, that the foregoing relates to exemplary embodiments of the invention and that modifications may be made without departing from the spirit and scope of the invention as set forth in the following claims.

We claim:

1. A drive system, comprising:
a first clutch member coaxially adapted for connection to a shaft, the first clutch member including a first engagement face;
a second clutch member adapted for connection to a drive output member, the second clutch member including a second engagement face indexed for coupling to the first engagement face; and
a race defined by walls of the first and second clutch members, the race being disposed between the first and second engagement faces, the race extending radially toward circumferential edges of the first and second clutch members, the race configured to receive a weight that travels radially inwards towards or outwards away from the shaft, and within the race, and the first and second clutch members are adapted to engage with or separate from one another as the weight travels radially inwards towards or outwards away from the shaft in the race during rotation of the shaft.

2. The drive system of claim 1, further comprising a spring attached to at least one of the first and second clutch members, the spring configured to bias the first clutch member into engagement with or disengagement from the second clutch member.

3. The drive system of claim 1, wherein the race includes at least one tapering wall surface.

4. The drive system of claim 3, wherein the tapering wall surface tapers narrowingly toward the circumferential edges.

5. The drive system of claim 1, wherein the second clutch member is disengaged from the first clutch member in response to the weight moving radially outward toward the circumferential edges.

6. A drive system, comprising:
a first clutch member coupled to a shaft;
a second clutch member operatively adjacent to the first clutch member, the second clutch member configured to:
couple to the first clutch member in response to the rotational speed of the shaft equaling or falling below a first threshold rotational speed, and
de-couple from the first clutch member in response to the rotational speed of the shaft exceeding the first threshold rotational speed; and
a third clutch member configured to:
couple to the second clutch member in response to the rotational speed of the shaft exceeding the first rotational speed.

7. The drive system of claim 6, further comprising a first weight adjacent the third clutch member.

8. The drive system of claim 7, wherein the first weight is configured to move centrifugally against the third clutch member.

9. The drive system of claim 7, wherein the first weight is disposed to move radially outward toward a circumferential edge of the third clutch member.

10. The drive system of claim 8, further comprising a second weight between the first and second clutch members disposed to move radially outward toward circumferential edges of the first and second clutch members during rotation of the shaft.

11. The drive system of claim 10, wherein a mass of the first weight does not equal a mass of the second weight.

12. The drive system of claim 6, further comprising a synchronization cone disposed between the second clutch member and the third clutch member configured to synchronize mating between the second clutch member and the third clutch member.

13. A drive system, comprising:
a first clutch plate coupled to a shaft;
a second clutch plate including a first surface indexed to couple with a surface of the first clutch plate, the first clutch plate surface and the second clutch plate first surface including race wall surfaces configured to form a first race between the first and second clutch plates, the first race extending radially outward from the shaft toward circumferential edges of the first and second clutch plates;
a first weight disposed in the first race;
a third clutch plate coupled to a drive output member, the second clutch plate including a second clutch plate surface configured to:

couple with a first surface of the third clutch plate in response to a radially outward movement of the first weight in the first race, and de-couple from the first surface of the third clutch plate in response to a radially inward movement of the weight in the first race.

14. The drive system of claim 13, further comprising a fourth clutch plate including a surface configured to couple with a second surface of the third clutch plate, the fourth clutch plate configured to de-couple from the second surface of the third clutch plate in response to the rotational speed of the shaft exceeding a threshold.

15. The drive system of claim 14, further comprising:

a second race disposed between the first surface of the third clutch plate and the surface of the fourth clutch plate race, the second race extending radially outward toward circumferential edges of the third and fourth clutch plates; and a second weight disposed in the second race, wherein the fourth clutch plate is configured to de-couple from the third clutch plate in response to a radially outward movement of the second weight in the second race.

16. The drive system of claim 15, wherein a mass of the first weight is less than a mass of the second weight.

17. The drive system of claim 14, including:

a first plurality of races between the first and second clutch plates;

a second plurality of races between the third and fourth clutch plates;

a first quantity of the first weights in the first plurality of races; and a second quantity of the second weights in the second plurality of races, wherein the first quantity is unequal to the second quantity.

18. The drive system of claim 17, wherein the mass of the first weights does not equal the mass of the second weights.

* * * * *